(12) United States Patent
Gross et al.

(10) Patent No.: US 6,433,770 B1
(45) Date of Patent: *Aug. 13, 2002

(54) LIQUID CRYSTAL LENS CIRCUIT

(75) Inventors: Hyman Abraham Moses Gross; Richard Anthony McMahon, both of Cambridge (GB)

(73) Assignee: Crystalens Ltd., Cambridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/256,444

(22) PCT Filed: Jan. 20, 1993

(86) PCT No.: PCT/GB93/00119

§ 371 (c)(1),
(2), (4) Date: Jul. 12, 1994

(87) PCT Pub. No.: WO93/14435

PCT Pub. Date: Jul. 22, 1993

(30) Foreign Application Priority Data

Jan. 20, 1992 (GB) .............................. 9201124

(51) Int. Cl.$^7$ .............................. G09G 3/36
(52) U.S. Cl. .............................. 345/102; 345/207
(58) Field of Search .............................. 350/331, 357; 351/44; 348/14; 250/205; 375/1; 345/102, 207; 365/87, 84, 102

(56) References Cited

U.S. PATENT DOCUMENTS

| 4,279,474 | A | * | 7/1981 | Belgorod .............. 350/331 |
| 4,560,239 | A | * | 12/1985 | Katz .............. 350/331 |
| 5,015,086 | A | * | 5/1991 | Okaue et al. .............. 351/44 |
| 5,285,060 | A | * | 2/1994 | Larson et al. .............. 250/214 AL |
| 5,402,040 | A | * | 3/1995 | Sprout et al. .............. 315/158 |
| 5,742,131 | A | * | 4/1998 | Sprout et al. .............. 315/157 |

FOREIGN PATENT DOCUMENTS

| DE | 2913571 | * | 6/1979 |
| EP | 0253686 | * | 1/1988 |
| GB | 2190516 | * | 11/1987 |
| GB | 9314435 | * | 7/1993 |
| JP | 0151286 | * | 12/1984 |
| JP | 4134320 | * | 8/1992 |

* cited by examiner

Primary Examiner—Richard Hjerpe
Assistant Examiner—Ronald D Laneau
(74) Attorney, Agent, or Firm—Birch, Stewart, Kolasch & Birch, LLP

(57) ABSTRACT

A liquid crystal lens drive circuit for a pair of spectacles has user-controllable components which can be used to adjust a response time of the circuit to changes in ambient light and to adjust the particular response of the circuit to excess light above a threshold in accordance with a desired response characteristic. Momentary changes in the light level from the general ambient can be prevented from changing the optical density of the lenses unnecessarily, and individual preferences as to the darkening characteristics can be accommodated in a standard pair of spectacles.

11 Claims, 5 Drawing Sheets

LIQUID CRYSTAL LENS CIRCUIT

The present invention relates generally to variable optical density lenses and in particular to lenses in which the optical density is controlled as a settable function of ambient light intensity.

Optical devices using liquid crystal lenses are known from, for example, U.S. Pat. No. 4,021,935, U.S. Pat. No. RE-29 684, U.S. Pat. Nos. 4,190,330 and 4,106,217. A type of variable optical density spectacle lens which responds to changes in ambient light is described in U.S. Pat. No. 4,279,474. The arrangement described therein uses a liquid crystal means sandwiched between a pair of matching curved glass lenses. This system gives a response time which is much faster than that of photochromic lenses. The rapid response of the liquid crystal lens overcomes the drawbacks of prior photochromic lens. The variation in optical density is achieved by driving the spectacle lens with an electrical signal of suitable waveform.

However, the response time of the liquid crystal lenses as described in U.S. Pat. No. 4,279,474 and other prior art is unlikely to represent the optimum for all users under all conditions. The actual response time of the lens will be determined by whichever of the response time of the liquid crystal or the time for the driving waveform to change is longer.

It is particularly important to achieve a satisfactory response time even in situations where, for example, the light falling on the photodetector is momentarily reduced and, with a short response time, the lenses would otherwise become maximally transmissive (optical density at a minimum), even though the general ambient level remains high. Practical cases of this are when driving on a sunny day through shadows cast by railings or a row of trees. At the same time, it is important still to provide for a fast response to changes in the ambient light level such as occur when a vehicle enters a tunnel or when the wearer of spectacles looks suddenly in the sun's direction. Both requirements should be met for a commercially attractive product.

According to a first aspect of the present invention, there is provided an electrical circuit for controlling the optical density of a liquid crystal lens in dependence upon ambient light levels, in order to adjust the amount of light transmitted through the lens, the circuit including means for adjusting the response time of the circuit to changes in ambient light.

This provides the user with the ability to accommodate different lighting or use conditions and individual preferences and particularly allows the user to adjust the response time to cope with non-representative lighting situations which are suddenly and temporarily different from the general ambient conditions.

Further related considerations are the threshold light level at which the optical density starts to change and the rate of increase in optical density with excess light above this threshold. It is likely that the preferred threshold for response and the response characteristic above the threshold will vary both with latitude and season for example. In addition, for therapeutic applications, particularly photophobic conditions such as occur after cataract removal operations for example, both these parameters will need to be precisely controlled. Practical photodetectors are unlikely to have the required response characteristic.

Furthermore, it is desirable to cater for a wide range of individual preferences regarding the degree of darkening without having to provide a wide range of products to suit those individual preferences.

According to a second aspect of the invention therefore, there is provided an electrical circuit for controlling the optical density of a liquid crystal lens in dependence upon ambient light levels, in order to adjust the amount of light transmitted through the lens, the circuit including a photodetector, and means for adjusting the response of the circuit to excess light, above the threshold at which the optical density of the lens begins to change, in accordance with a desired response characteristic.

The invention also preferably includes means for adjusting the threshold of ambient light at which the circuit starts to adjust the optical density of the lens.

This is particularly useful in allowing for the variation of eye contraction and dilation which many people experience and which can be particularly acute for people with certain eye disorders.

The invention is thus able to provide a means for varying the rate at which the optical density changes in response to changes in ambient light, and, in addition, comprises an arrangement for setting the threshold at which darkening starts and a means for obtaining a desired darkening characteristic above the threshold.

The ambient light can be sensed by a photodetector, which may be a photodiode, photosensitive resistor or other photosensitive device, and a voltage is developed across a load resistor, or by using another circuit, which is a function of light level. In an analogue system the signal may be fed to an amplifying stage, where the gain is a function of signal level and a steady offset voltage may be added to set the threshold. The signal passes to a filter in which the time constant is set by a user adjustable control employing a potentiometer. The signal from the amplifying stage is fed to a voltage controlled oscillator. The duty cycle of the output from this oscillator depends on the control signal and the output is used to drive the lenses. The increase of optical density of the lenses depends on the duty cycle of the oscillator output, so that a desired response characteristic to light can be achieved by tailoring the gain characteristic of the amplifying stage. The oscillator pulse repetition rate is set so that the residual flicker of light transmitted through the lens is reduced to an acceptable level.

However, a digital circuit is preferred, in which case, the developed voltage can be fed to an analogue-to-digital converter, the output of which is passed to a signal conditioner and thence to a digital filter and a digitally controlled waveform generator which controls the liquid crystals of the lens.

Two examples of devices according to the present invention will now be described with reference to the accompanying drawings, in which:

FIG. 1 is a simplified diagram of a circuit for controlling the optical density of a lens;

FIGS. 2(*a*) & 2(*b*) are diagrams showing waveforms found in operation of the lens;

FIGS. 3(*a*) & 3(*b*) are diagrams showing the waveforms during a transition from high optical density to low optical density with two different response times;

Figure 1:
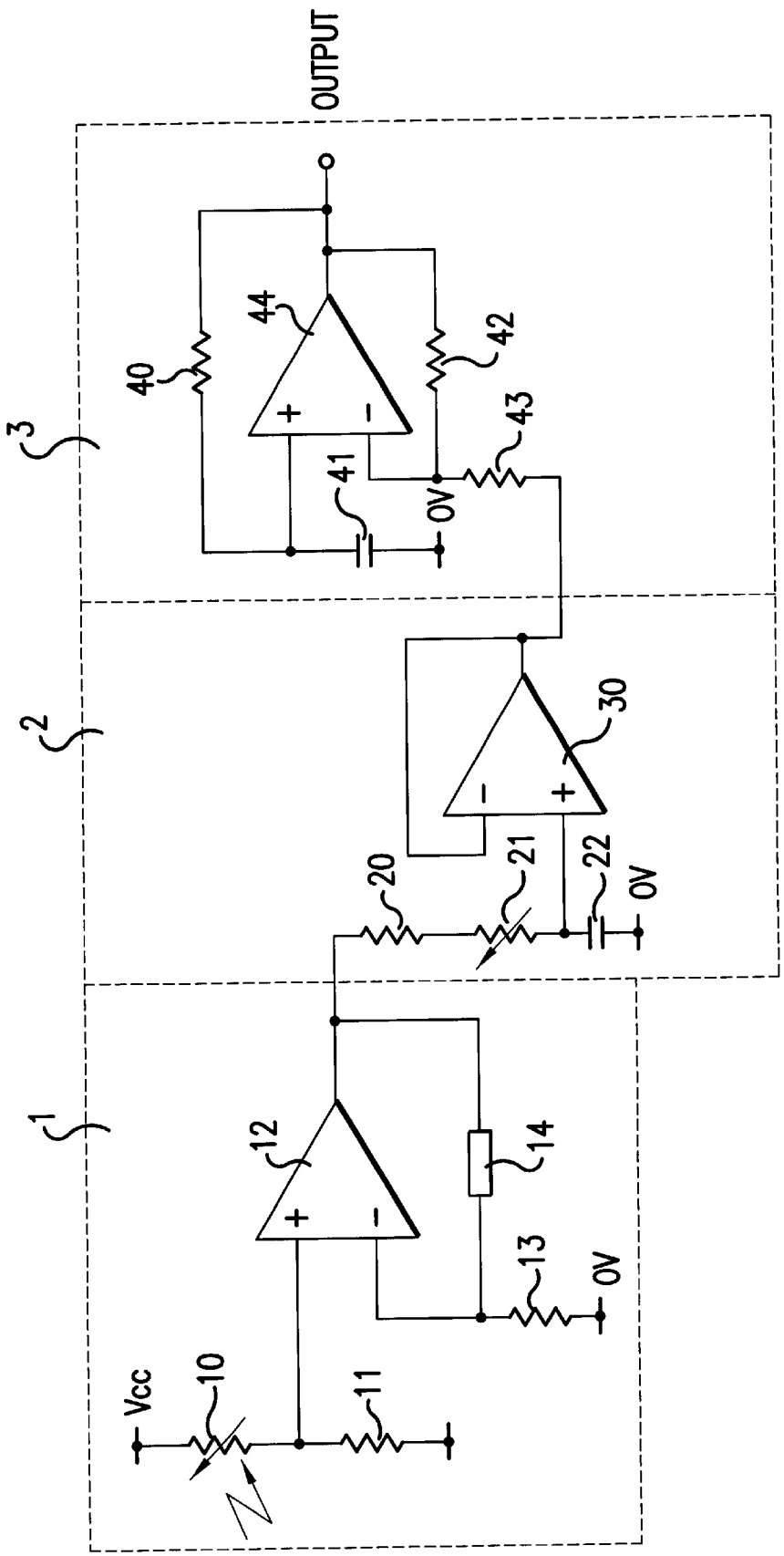

The circuit shown in FIG. 1 is a simplified diagram of a circuit for controlling the optical density of a lens, with a variable response time and with a particular response characteristic, in response to changes in ambient light.

Referring to FIG. 1, the circuit includes a detector section 1 which has a photosensitive resistor 10. A signal is developed across the load resistor 11, as the two resistive elements form a potential divider across a supply voltage $V_{cc}$. Typical photosensitive resistors have changes in resistance from >10 MΩ (dark) to a few hundred ohms (light). Therefore the load resistance is likely to be a few kilohms, giving an output from <1% of $V_{cc}$ to >90% of $V_{cc}$.

The circuit based around the operational amplifier 12 acts both as a high input impedance buffer and as a variable gain element. The gain is defined by a feedback network 14 and a fixed resistor 13. Knowing how the duty cycle of the voltage controlled oscillator depends on control voltage, a desired darkening characteristic may be achieved by making the gain of the stage depend on the signal, ie ambient light, and level off in a particular way. In this circuit this is done by adjustment or switching of one or more components within the feedback network 14. This network may incorporate non-linear elements such as diodes or field effect transistors in conjunction with resistors and which are controlled appropriately. Alternatively a passive network or an analogue circuit function such as a logarithmic amplifier could be used. The operational amplifier could be of the TL084 type, although low power consumption, low operating voltage types are preferable. Ideally, it would be part of an application specific integrated circuit (ASIC).

The threshold for darkening depends on the values of the load resistor 11 for the light sensor and the gain characteristic of the amplifier 12 as determined by the resistor 13 and feedback network 14 and these may be arranged to be adjusted if desired in well-known manner. For the user, consistency of setting the optical controls is important and this is readily achieved by the circuit proposed.

Alternative light sensing systems include the use of a photodiode, either in a photovoltaic mode or reverse biased in a photoconductive mode, operating into the input of an operational amplifier configured as a transresistance amplifier.

The buffered and modified signal is sent to a filter/buffer section 2, the filter being of variable frequency response. The circuit shown is a simple passive filter. The response is set by the combined resistance of a fixed resistor 20 and a variable resistor 21, and a fixed capacitor 22. The variable resistor 21 is a control which can be varied by the user to change the time constant of the filter and hence the response time of the spectacles to changes in light level.

The sizes of the fixed resistor 20 and the capacitor 22 are chosen to give a suitable shortest response time, expected to be about 0.5 s. The size of the variable resistor is chosen to increase the response time up to the longest value desired, perhaps 10 s. The time constants involved, with a variable resistor of 1MΩ, suggest a capacitor of 10 µF.

To avoid the need for a large capacitor, an active filter based on an operational amplifier may offer useful improvements in performance.

Figure 2A:
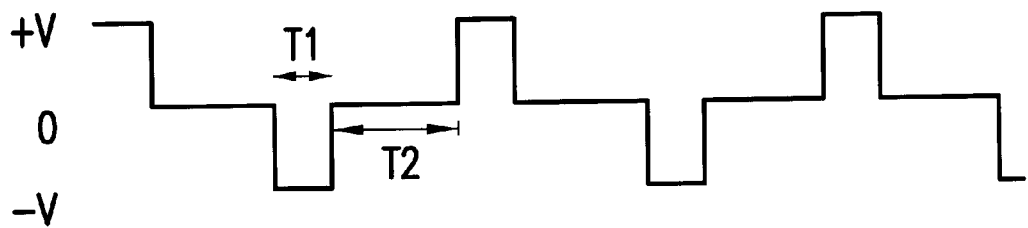
Figure 2B:
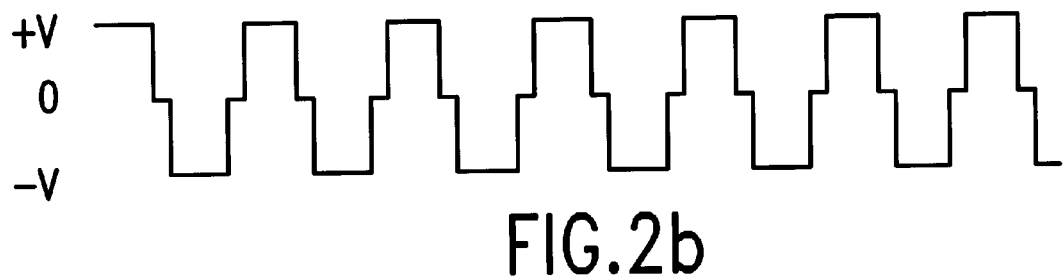

The signal from the filter then goes to an oscillator 3 via a buffer amplifier 30, to eliminate any interaction between filter and oscillator. The oscillator is a relaxation oscillator employing an operational amplifier 44, with switching levels set by the control voltage and resistors 42 and 43, in which the duty cycle is controlled by the input voltage. Typical waveforms are shown in FIG. 2(a) for a steady low light level and in FIG. 2(b) for a steady high light level. In this arrangement, the time T1 in the state of maximum optical density is constant and the time T2 in the state of minimum optical density is variable. Other waveforms, for example, a uni-polar waveform could also be used of course.

The duty cycles and maximum pulse lengths are shown similarly to those as in U.S. Pat. No. 4,279,474. The change in duty cycle depends on resistors 42 and 43 and approximately on the natural logarithm of the control voltage. The output of the oscillator may be arranged so that the minimum pulse repetition rate is above the flicker fusion frequency of the eye in order to reduce residual flicker. The spectacle lens is as described in U.S. Pat. No. 4,279,474. The lens can be driven with a bi-level output or a tri-state output as described in that patent specification.

Figure 3A:
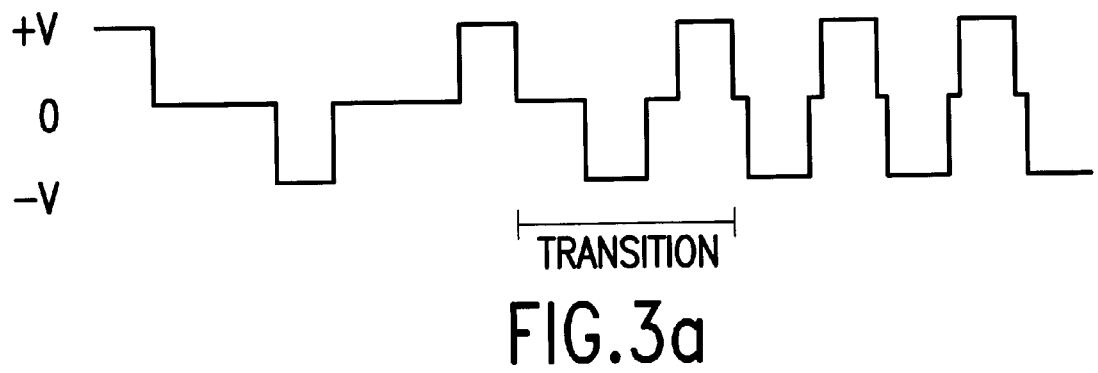
Figure 3B:
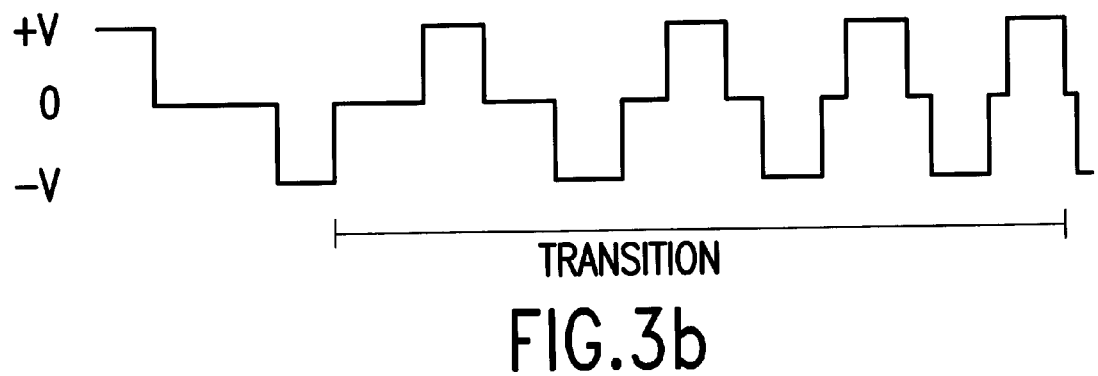
Figure 4:
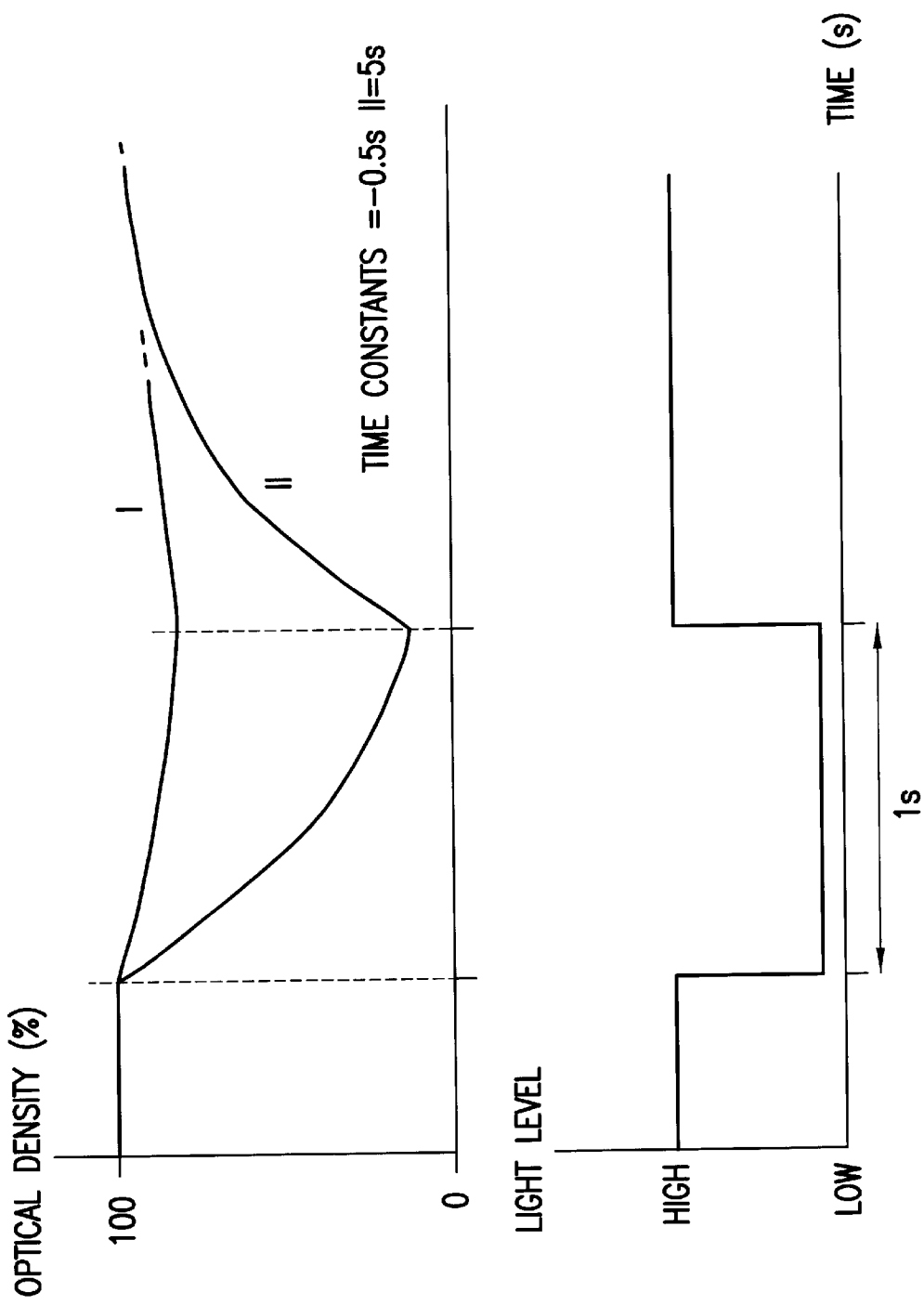
FIG. 4 is a diagram showing changes in lens optical density, with two response settings, for a change in light level.

The range of response times, as illustrated in FIGS. 3(a) and (b), is adjusted by means of the control resistor 21. In each case the change in light level is the same, but the response time of the circuit is different. The use of the variable response time feature to combat flicker is seen in FIG. 4, which shows a steady high light level which drops for a period of one second, which could be the effect of passing through a shadow. The response of the lens is shown for two settings. With a 5 s setting, the change in optical density is less than 20%, whereas with a 0.5 s setting, the change is 80%. As an alternative to a continuously variable setting, a compromise response could be set at the time of manufacture.

Figure 6:
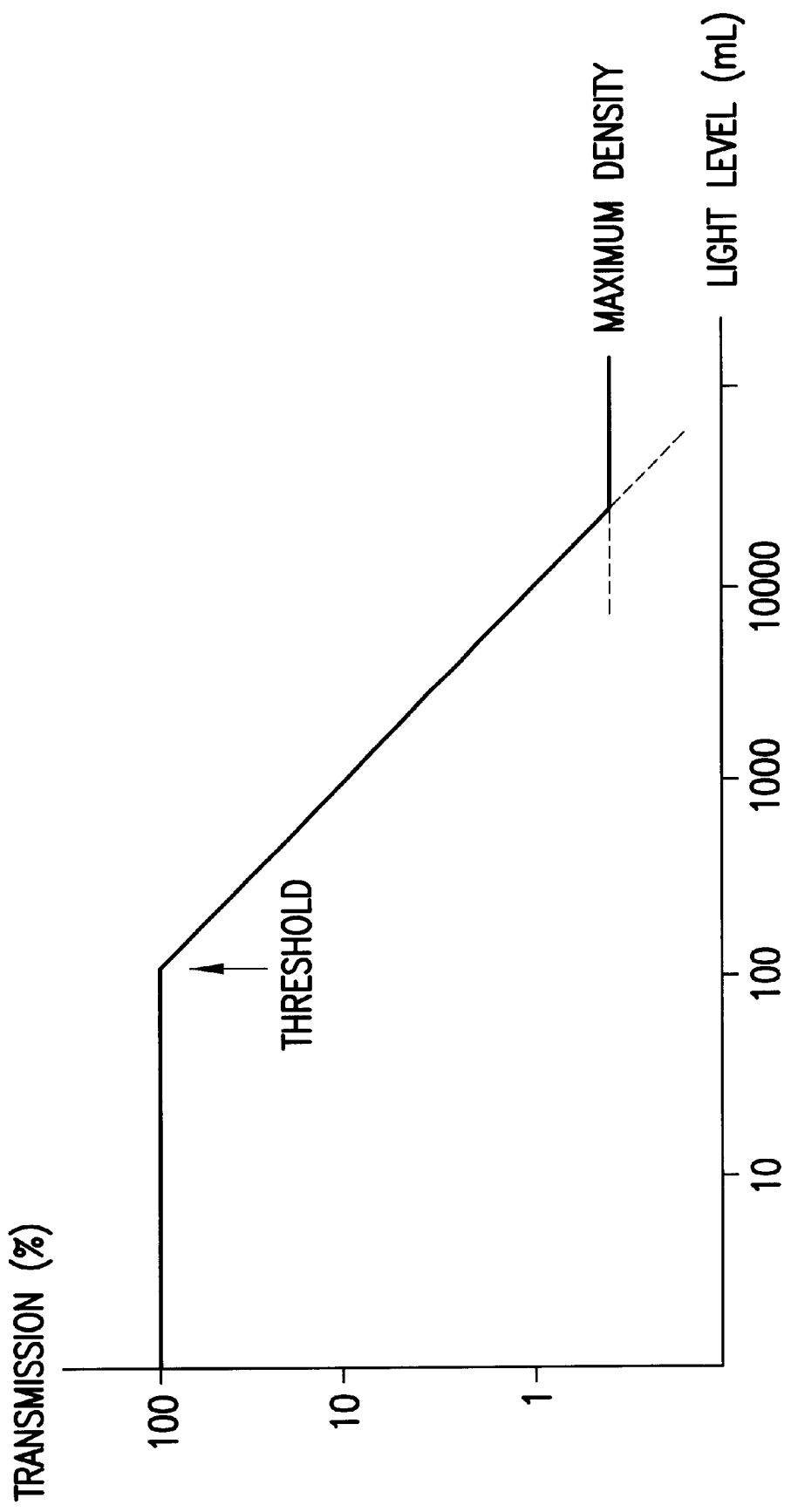
FIG. 6 is a diagram showing the transmission of the lenses as a function of light level.

It may, in certain circumstances, be desirable to have a constant light level falling on the eye above a threshold value, as shown in FIG. 6 where the threshold is a light level of 100 mL, and the transmission of the lens halves for every doubling of light level above the threshold, until the lens attains maximum optical density, but a more limited range of change, say providing a 5 to 1 change in optical density will, in general, suffice for everyday use. A response of this type would be achieved using the level dependent amplifier to compensate for the characteristics of the oscillator and photodetector. It may be advantageous to make the buffer amplifier 30 between the filter and oscillator have a non-linear gain characteristic to obtain a particular relationship between duty cycle and signal level at the output of the filter. Obviously, a wide range of other responses are possible.

The circuits described are one particular means for realizing the technical principles involved in this invention. There are likely to be many detailed variations to achieve particular performance aims and compromises. For incorporation into a spectacle frame, certain features are important. These include small size, ability to work off a low voltage, the actual value being determined by the minimum to drive the lenses, and low current consumption. An attractive solution is likely to be the use of an ASIC for all circuitry except the external controls and probably the fixed capacitors.

The circuitry described here is, basically, an analogue system. However, a digital system may be preferable, with the required response implemented through hardware or software. The essence of such a system is the conversion of the analogue signal from the photodetector by means of an analogue-to-digital converter and the processing of the digital signal by hardware or using a simple microprocessor with a software program to produce an output suitable for driving the lens. The microprocessor approach is very powerful in that a wide range of responses can be obtained from the same basic circuit.

Figure 5:
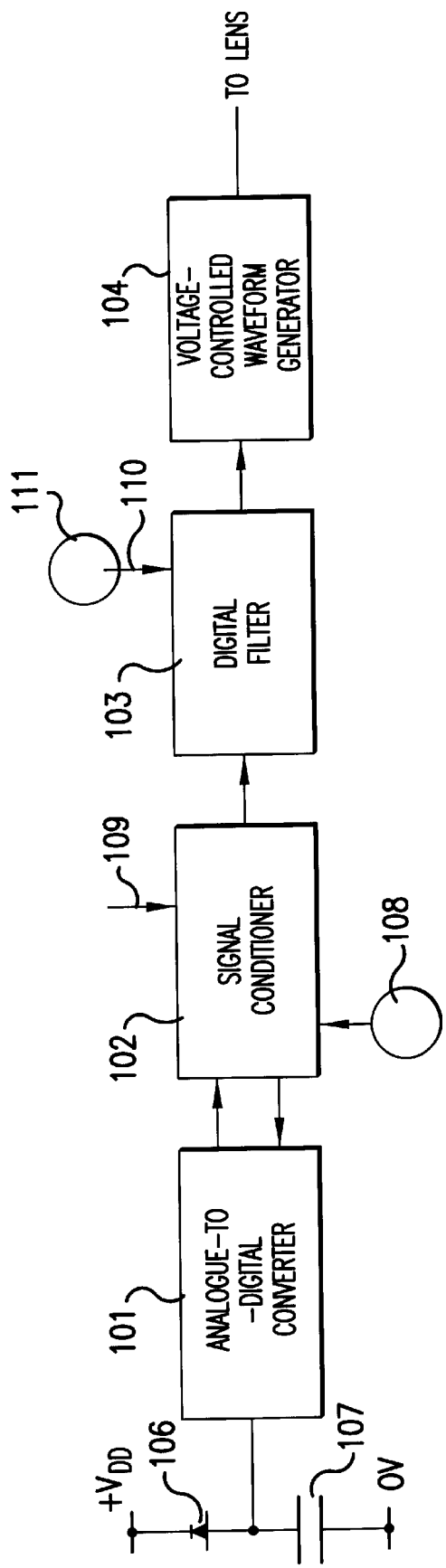
FIG. 5 is a block diagram of a digital control circuit.

Such a digital circuit is shown in simplified form in FIG. 5 and comprises a photodiode 106 and capacitor 107, which are used to adjust a drive voltage applied to an analogue-to-digital converter 101 from which a signal is passed to a signal conditioner 102 and thence to a digital filter 103 and a digitally controlled waveform generator 104 which controls the liquid crystals of the lens 105.

In the particular system shown in FIG. 5, the reverse biased photodiode 106 is used as a photodetector and, together with the capacitor 107, forms an input stage to the analogue-to-digital converter 101. The conversion rate is determined by the required overall response of the spectacles; for a 0.5 s response time, a conversion rate of ten samples per second is adequate. The accuracy of conversion depends again on the overall specification of the spectacles, but for general purposes, where a 5 to 1 change in optical density ratio is employed, 6 bit conversion, or 64 light levels, is acceptable.

The correspondence of the level of ambient light to the range of input voltage to the anologue-to-digital converter is set by the choice of photodiode and capacitor. However, it may be desirable to be able to set a threshold level below which the digital output corresponding to the light level remains unaltered. This is readily achieved by suitable logic and the threshold can readily be modified by a suitable digital control input, set by a switch 108, allowing the external setting of a threshold if so desired.

Above the threshold, selection of a designated/chosen response characteristic is desirable. The response to the excess light above the threshold is an important consideration and particular characteristics can be obtained through the use of look-up tables, provided in the signal conditioner 102, to convert values of digitised light levels to particular respective pulse waveforms for application to the liquid crystal cells of the lens. The response characteristic to excess light is user set through a digital input 109 to the signal conditioner.

The variable response time of the system to changes in ambient light is implemented by a digital filter, the response time being set by an external input 110 adjustable by the user, and the filter can be made to have a response which approximates closely to that of a network comprising a resistor and a capacitor. The external input 110 can conveniently be set by a multi-position switch 111.

The digitally controlled waveform generated in the waveform generator 104 performs the same function as in the analogue example above, but is controlled by a digital input from the filter 103.

What is claimed is:

1. A combination comprising:
   at least one liquid crystal lens with a variable optical density to adjust the amount of light transmitted through said at least one liquid crystal lens; and
   an electrical circuit for controlling the variable optical density of said at least one liquid crystal lens, wherein said electrical circuit includes:
      a first section of circuitry (1) for detecting an ambient light level and for generating a light level signal indicative of the ambient light level; and
      additional circuitry (2, 3) for processing the light level signal and for generating a drive signal for controlling the optical density of said at least one liquid crystal lens, wherein said additional circuitry includes a user-variable response time adjustment which is adjustable by a user to change a rate at which the optical density of said at least one liquid crystal lens changes in response to changes in the ambient light level.

2. The combination according to claim 1, wherein said additional circuitry further includes:
   a filter and buffer section (2) for receiving the light level signal from said first section of circuitry; and
   an oscillator (3) responding to an output of said filter and buffer section and generating the drive signal for controlling the optical density of said at least one liquid crystal lens.

3. The combination according to claim 2, wherein said filter and buffer section includes:
   a variable resistor for changing a time constant of said filter and buffer section, which results in a change in the drive signal output by said oscillator, and wherein said variable resistor is said user-variable response time adjustment which is adjustable by a user to change a rate at which the optical density of said at least one liquid crystal lens changes in response to changes in the ambient light level.

4. The combination according to claim 2, wherein said first section of circuitry includes:
   a light sensitive element;
   an operational amplifier connected to said light sensitive element; and
   a feedback network connected to said operational amplifier.

5. The combination according to claim 4, wherein said feedback network includes:
   a user-variable threshold adjustment, which changes a feedback characteristic of said feedback network and hence a gain characteristic of said operational amplifier, wherein said user-variable threshold adjustment is adjustable by a user to change a threshold value for changes in ambient light, above which the optical density of said at least one liquid crystal lens will be varied by said oscillator, and below which the optical density of said at least one liquid crystal lens will not be varied by said oscillator.

6. The combination according to claim 1, wherein said first section of circuitry includes:
   a light detector for detecting the ambient light level and for generating an analogue signal; and
   an analogue-to-digital converter for receiving the analogue signal and for converting it into a digital signal which is the light level signal indicative of the ambient light level, and
   wherein said additional circuitry includes:
      a signal conditioner connected to said analogue-to-digital converter;
      a digital filter connected to said signal conditioner; and
      a digitally controlled waveform generator connected to said digital filter for generating the drive signal for controlling the optical density of said at least one liquid crystal lens.

7. The combination according to claim 6, wherein said user-variable response time adjustment provides an input to said digital filter which adjusts a response time of said digital filter.

8. The combination according to claim 6, further comprising:
   a user-variable threshold adjustment, which is adjustable by a user to change a threshold value for changes in ambient light, above which the optical density of said at least one liquid crystal lens will be varied by said digitally controlled waveform generator, and below which the optical density of said at least one liquid crystal lens will not be varied by said digitally controlled waveform generator.

9. The combination according to claim 8, wherein said user-variable threshold adjustment provides an input to said signal conditioner, and wherein said signal conditioner includes a plurality of look-up tables, each of which converts values of said light level signal into a selected waveform.

10. The combination according to claim 1, wherein said additional circuitry includes a microprocessor.

11. The combination according to claim 1, wherein said at least one liquid crystal lens is part of a pair of spectacles.

* * * * *